United States Patent Office 3,468,912
Patented Sept. 23, 1969

3,468,912
3-CYANO 2(5H) FURANONES AND THEIR PREPARATION
John A. Ford, Jr., and Charles V. Wilson, Rochester, N.Y., assignors to Eastman Kodak Company, Rochester, N.Y., a corporation of New Jersey
No Drawing. Filed June 6, 1966, Ser. No. 555,239
Int. Cl. C07d 5/16
U.S. Cl. 260—343.6                                       5 Claims

ABSTRACT OF THE DISCLOSURE

Process for preparing 3-cyano-2(5H)furanone compounds which comprises heating an alkali metal salt of cyanoacetic acid with an alpha haloacetophenone, a monohaloacetaldehyde or a monohaloalkylketone and novel 3-cyano-2(5H)furanone compounds.

This invention relates to novel cyano furanones and to a method for their preparation.

One object of our invention is to provide dye intermediates which are readily convertible to dyes. Another object of our invention is to provide dye intermediates from which dyes may be obtained that are useful for dyeing synthetic fibers. A further object of our invention is to provide dye intermediates from which dyes useful as sensitizing dyes in electrophotography may be obtained. A still further object of our invention is to provide a process by which these intermediates are readily prepared. Other objects of our invention will appear herein.

We have found that if a halocarbonyl compound such as an alpha-haloacetophenone is reacted with an alkali metal salt of mono-cyanoacetic acid, there is obtained a 3-cyano-2(5H) furanone, a dye intermediate of valuable properties. We have found that some dyes prepared from intermediates of this type, absorb unexpectedly long wave lengths of light. We have found that the dye intermediates of our invention are highly reactive and are readily converted to dyes by relatively simple procedures. These dyes are valuable for dyeing synthetic fibers, particularly acetate, polyester and acrylic type fibers, and also have value as sensitizing dyes in electrophotography. These dyes and their use in electrophotography and for dyeing fabrics are included in the subject matter of a separate patent application Ser. No. 555,240 in our names, filed of even date.

Dye intermediates in accordance with our invention are represented by the following structural formula:

```
       O
      / \
   O=C   CH₂
     |    |
   CN—C===CR
``` in which Formula R is preferably alkyl, aryl, aralkyl or alkaryl. If desired, R can be an H substituent. These compounds will be referred to herein as 3-cyano-2(5H) furanones.

The dye intermediates in accordance with our invention are readily prepared by heating together under aqueous conditions a water soluble salt (such as alkali metal salt) of mono-cyanoacetic acid and an alpha-haloacetophenone, a mono-haloketone or a mono-haloacetoaldehyde.

For example the following reactants with sodium cyanoacetate give the products shown:

| Reactant | Product |
|---|---|
| Alpha-haloacetophenone | 3-cyano-4-phenyl 2(5H) furanone (I). |

```
         O                        O
         ‖                       / \
   X—CH₂—C—⟨  ⟩—Br        O=C   CH₂
                               |    |
                             CN—C===C—⟨  ⟩—Br
```

| | |
|---|---|
| Haloacetone (bromo or chloro) | 3-cyano-4-methyl 2(5H) furanone. |
| Haloacetaldehyde | 3-cyano 2(5H) furanone. |
| Halo-methyl, ethyl ketone | 3-cyano-4-ethyl 2(5H) furanone. |

An advantage of the dye intermediates of our invention is the simplicity of the procedure by which they may be converted to dyes. For instance by their reactions with the following reagents in a suitable organic solvent as described in more detail in our copending application Ser. No. 555,240 filed of even date the dye colors obtained are as follows:

(A) I+benzene diazonium chloride→orange dye
(B) I+benzaldehyde→yellow dye
(C) I+dimethylnitrosoaniline→magenta dye
(D) I+triethylorthoformate and tertiary amine (e.g. pyridine)→blue dye
(E) I+1,3,3-trimethoxy propene→cyan dye
(F) I+dialkylaminobenzene diazonium chlorida→blue dye
(G) I+p-dimethylaminobenzaldehyde→red dye.

The various dyes thus prepared are useful for dyeing synthetic fibers, particularly acetate fibers, polyester fibers or acrylic fibers.

The method of preparing the dye intermediates of the invention by heating together the reactants in an aqueous solvent, preferably aqueous alcohol is illustrated by the following example:

Example I 170 parts (2.00 moles) of cyanoacetic acid and 80 parts (2.00 moles) of sodium hydroxide were dissolved in a mixture of 2367 parts by weight of ethanol and 720 parts of water. 398 parts (2 moles) of 2-bromoacetophenone were added thereto. The resulting mass was refluxed, with stirring, for 1 hour and was then allowed to cool to room temperature. The solid which formed was filtered off, was washed with 400 parts of ethanol-water (1:1) and was recrystallized with 633 parts by weight of acetonitrile to give 145.9 parts of the straw-colored crystals of 3-cyano-4-phenyl 2(5H) furanone having a melting point of 164–167° C.

In a like preparation in which the sodium salt of cyanoacetic acid was reacted with

```
              O
              ‖
        Br—CH₂—C—⟨  ⟩—Br
``` there was obtained in 32.1% yield 3-cyano-4-p-bromophenyl 2(5H) furanone melting at 215–218° C.

These products were found to be useful as intermediates in the preparation of various colored dyes some of which are capable of absorbing unexpectedly long wave lengths of light.

We claim:
1. A method of preparing a 3-cyano-2(5H)furanone having the formula:

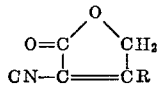

wherein R represents phenyl, p-bromophenyl, lower alkyl or a hydrogen atom which comprises heating an alkali metal salt of cyanoacetic acid with

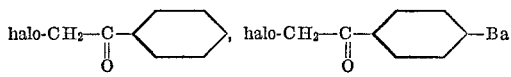

a monohaloacetaldehyde or a monohalo (low carbon alkyl)ketone, wherein halo stands for bromo or chloro under aqueous conditions.
2. The method in accordance with claim 1 wherein the reaction mixture is heated at its refluxing temperature.
3. The method of preparing a cyanofuranone in accordance with claim 2 wherein the halocarbonyl compound is 2-bromoacetophenone or

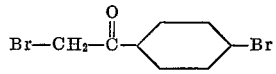

and the alkali metal salt of cyanoacetic acid is sodium cyanoacetate.
4. A compound having the formula:

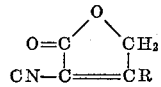

wherein R represents phenyl, p-bromophenyl, lower alkyl or a hydrogen substituent.
5. A compound in accordance with claim 4 in which R is lower alkyl.

References Cited
UNITED STATES PATENTS
3,113,939  12/1963  Martin _____ 260—343.6 X ALEX MAZEL, Primary Examiner J. A. NARCAVAGE, Assistant Examiner U.S. Cl. X.R.

96—1.6; 8—55

PO-1050
(5/69)

UNITED STATES PATENT OFFICE
CERTIFICATE OF CORRECTION

Patent No. 3,468,912      Dated March 4, 1970

Inventor(s) John A. Ford, Jr., and Charles V. Wilson

It is certified that error appears in the above-identified patent and that said Letters Patent are hereby corrected as shown below:

Column 2, line 28, change "chlorida" to --- chloride

Claim 1, change "halo-CH₂—C(=O)—⬡—Ba" to

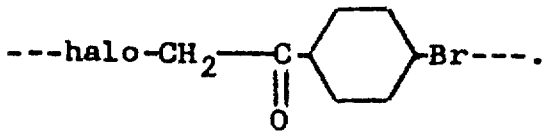

---halo-CH₂—C(=O)—⬡—Br---.

SIGNED AND
SEALED
AUG 25 1970

(SEAL)
Attest:

Edward M. Fletcher, Jr.
Attesting Officer

WILLIAM E. SCHUYLER, JR.
Commissioner of Patents